(12) United States Patent
Yan et al.

(10) Patent No.: US 12,219,395 B2
(45) Date of Patent: Feb. 4, 2025

(54) WIRELESS PARAMETER LIMITS FOR PREDICTED vRAN RESOURCE LOADS

(71) Applicant: Microsoft Technology Licensing, LLC, Redmond, WA (US)

(72) Inventors: Yu Yan, Kirkland, WA (US); Anuj Kalia, Newcastle, WA (US); Sanjeev Mehrotra, Kirkland, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 429 days.

(21) Appl. No.: 17/825,596

(22) Filed: May 26, 2022

(65) Prior Publication Data
US 2023/0388856 A1    Nov. 30, 2023

(51) Int. Cl.
| | |
|---|---|
| H04W 28/08 | (2023.01) |
| H04L 1/00 | (2006.01) |
| H04W 28/02 | (2009.01) |
| H04W 28/24 | (2009.01) |

(52) U.S. Cl.
CPC ....... *H04W 28/0942* (2020.05); *H04L 1/0003* (2013.01); *H04W 28/0289* (2013.01); *H04W 28/24* (2013.01)

(58) Field of Classification Search
CPC ......... H04W 28/0942; H04W 28/0289; H04W 28/24; H04L 1/0003; G06F 9/505; G06F 9/5072; G06F 9/5077
See application file for complete search history.

(56) References Cited

U.S. PATENT DOCUMENTS

| | | |
|---|---|---|
| 2020/0296741 A1 | 9/2020 | Ayala Romero et al. |
| 2022/0094597 A1* | 3/2022 | Ha .......................... H04L 43/20 |

FOREIGN PATENT DOCUMENTS

| | | |
|---|---|---|
| EP | 2849524 B1 | 3/2017 |

OTHER PUBLICATIONS

Ayala-Romero, et al., "vrAIn: Deep Learning based Orchestration for Computing and Radio Resources in vRANs", In Journal of IEEE Transactions on Mobile Computing, vol. 21, Issue 7, Dec. 8, 2020, 18 Pages.
"International Search Report and Written Opinion Issued in PCT Application No. PCT/US23/017356", Mailed Date: Jul. 18, 2023, 13 Pages.

* cited by examiner

*Primary Examiner* — Charles C Jiang
*Assistant Examiner* — Shawn D Miller

(57) ABSTRACT

A method for utilizing computing resources in a vRAN is described. A predicted resource load is determined for data traffic processing of wireless communication channels served by the vRAN using a trained neural network model. The data traffic processing comprises at least one of PHY data processing or MAC processing for a 5G RAN. Computing resources are allocated for the data traffic processing based on the predicted resource load. Wireless parameter limits are determined for the wireless communication channels that constrain utilization of the allocated computing resources using the trained neural network model, including setting one or more of a maximum number of radio resource units per timeslot or a maximum MCS index for the wireless parameter limits. The data traffic processing is performed using the wireless parameter limits to reduce load spikes that cause a violation of real-time deadlines for the data traffic processing.

20 Claims, 8 Drawing Sheets

WIRELESS PARAMETER LIMITS FOR PREDICTED vRAN RESOURCE LOADS

BACKGROUND

Radio access networks (RANs) are a part of the cellular network infrastructure (e.g., LTE and 5G) that converts wireless signals between user equipment and radio cell towers into data packets and vice versa. Manufacturers and providers of RANs are seeking to replace specialized RAN hardware with software systems running on commodity servers deployed in edge datacenters. This approach, called virtualized RAN (vRAN), has advantages of reduced vendor lock-ins, rapid feature development/upgrades, easier maintenance, and reduced costs. However, current vRAN deployments need to overcome challenges in high availability, servicing, or load balancing.

Distributed unit modules, which run lower layers of a vRAN stack, are configured to serve radio units (RUs). These lower layers include the physical layer (PHY, layer-1, or L1) and layer-2 (L2), which may be implemented as one or more software modules executed on processors within various servers of a datacenter. For example, a PHY module performs PHY processing for traffic that is transmitted between the distributed unit module and user equipment (UEs, e.g., mobile phones, smartphones). The PHY processing may include coding, modulation, scrambling, precoding, mapping, and Fourier transforms for each connected UE, however, a resource load for handling these steps by a distributed unit module may vary based upon various factors, such as how many UEs are connected to the distributed unit module, what modulation and coding scheme (MCS) each UE is using, how often the UEs send or receive data, etc. Generally, the resource load varies according to the time of day, with reduced resource load at night when users are not actively using their smartphones and increased resource load during daytime (e.g., as users make phone calls, view web pages, watch videos).

The distributed unit module may be executed using a group of servers, with each server having one or more processors and memory. In some scenarios, an allocation of servers for the distributed module is changed to achieve a desired balance between spectral efficiency and power efficiency. For example, during times of reduced resource load, the distributed unit module may be allocated four servers, while during times of increased resource load, the distributed unit module may be allocated ten servers. Two aspects that make allocation changes challenging are real-time latency requirements and high software complexity. In particular, PHY processing has stringent tail latency requirements (i.e., high latencies that clients see infrequently) among all RAN layers by requiring baseband processing tasks to be completed within strict transmission time intervals (TTIs) that can measure as low as 500 μs in 5G's common deployment configurations. As a result, existing approaches (e.g., Kubernetes for allocation management) are ineffective since they do not respond with increased allocations within an acceptable time.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to changing allocations of computing resources in a virtualized radio access network.

In one aspect, a method for utilizing computing resources in a virtualized radio access network (vRAN) is provided. The method comprises: determining a predicted resource load for data traffic processing of wireless communication channels served by the vRAN using a trained neural network model, wherein the data traffic processing comprises at least one of physical layer (PHY) data processing or medium access control layer (MAC) processing for a 5G radio access network; allocating computing resources for the data traffic processing based on the predicted resource load; determining wireless parameter limits for the wireless communication channels that constrain utilization of the allocated computing resources for the data traffic processing using the trained neural network model, including setting one or more of a maximum number of radio resource units (RUs) per timeslot or a maximum modulation and coding scheme (MCS) index for the wireless parameter limits; and performing the data traffic processing using the wireless parameter limits to reduce load spikes that cause a violation of real-time deadlines for the data traffic processing.

In another aspect, a method for utilizing computing resources in a virtualized radio access network (vRAN) is provided. The method comprises setting wireless parameter limits for wireless communication channels served by the vRAN, including setting one or more of a maximum number of radio resource units (RUs) per timeslot and a maximum modulation and coding scheme (MCS) index for the wireless parameter limits, wherein the wireless parameter limits constrain utilization of computing resources for data traffic processing of the vRAN and the data traffic processing comprises physical layer (PHY) data processing or medium access control layer (MAC) processing for a 5G radio access network; monitoring the data traffic processing while using the wireless parameter limits to obtain training data; training a neural network model to generate predicted resource loads for data traffic processing of the vRAN using the training data; determining a predicted resource load for data traffic processing of the vRAN within a next periodic frame interval; and allocating computing resources for the data traffic processing based on the predicted resource load for the next periodic frame interval.

In yet another aspect, a system for utilizing computing resources in a virtualized radio access network (vRAN) is provided. The system comprises a plurality of processors configured to execute a vRAN instance and perform data traffic processing of wireless communication channels served by the vRAN instance, and an autoscale processor configured to: determine a predicted resource load for data traffic processing of wireless communication channels served by the vRAN instance, wherein the data traffic processing comprises physical layer (PHY) data processing or medium access control layer (MAC) processing for a 5G radio access network; allocate processors of the plurality of processors for the data traffic processing based on the predicted resource load; and determine wireless parameter limits for the wireless communication channels that constrain utilization of the allocated processors for the data traffic processing, including setting one or more of a maximum number of radio resource units (RUs) per timeslot and a maximum modulation and coding scheme (MCS) index for the wireless parameter limits. The allocated processors perform the data traffic processing using the wireless parameter limits.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 1 illustrates an overview of an example system implementing a cloud RAN in accordance with aspects of the present disclosure.

FIGS. 2A-B illustrate examples of a far-edge datacenter of a cloud RAN hosting virtual RAN instances, in accordance with aspects of the present disclosure FIG. 3 shows a diagram of an example of a far-edge datacenter, according to an example embodiment.

DETAILED DESCRIPTION

Figure 1:
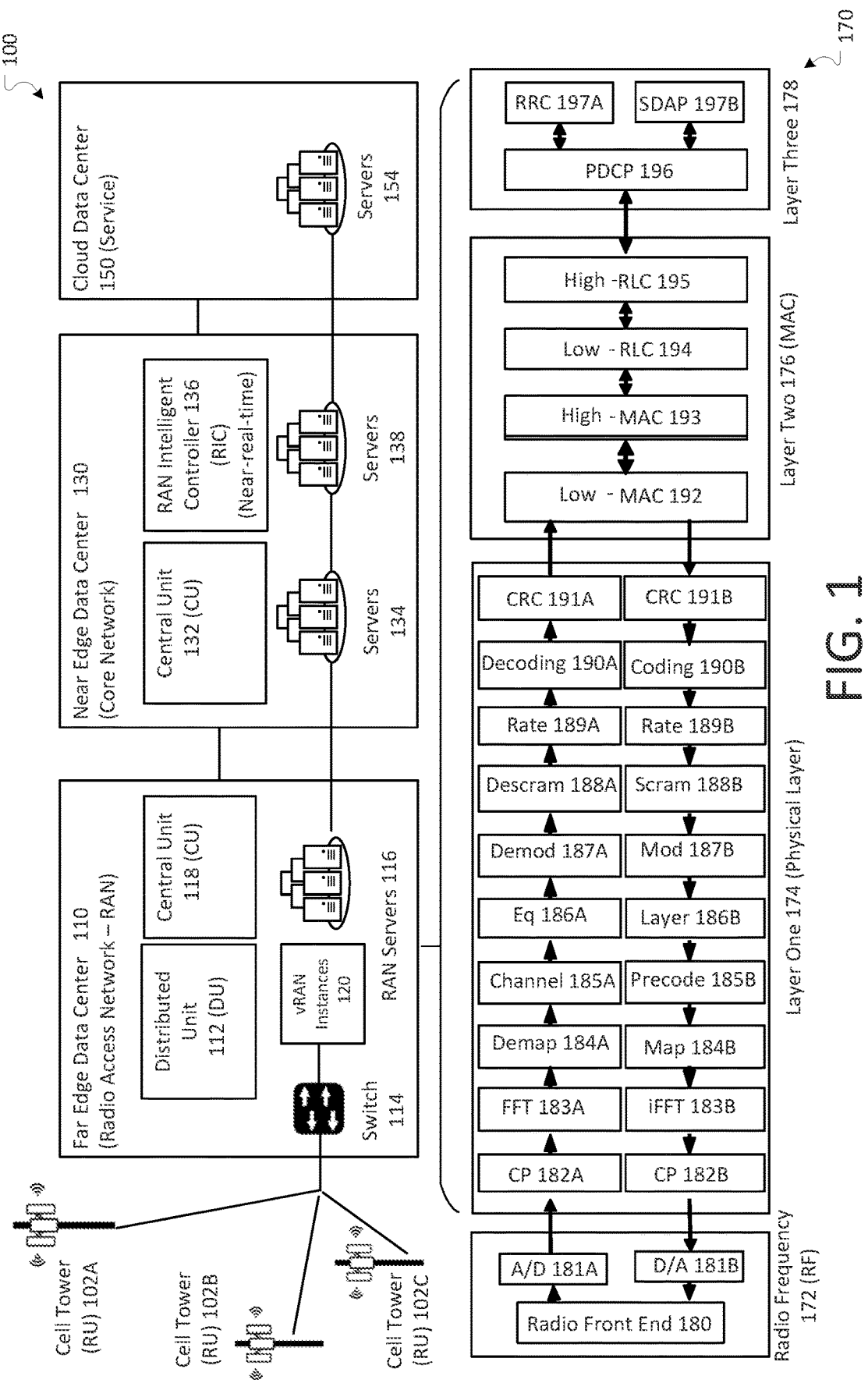

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of utilizing computing resources in a virtualized radio access network (vRAN). Changes in allocations for a vRAN may be referred to as "autoscaling" of the vRAN (i.e., of the computing resources) to better match a predicted resource load.

As the allocations are increased or reduced according to a predicted resource load, strict real-time deadlines must be met for compliance with vRAN operational needs. For example, physical layer (PHY) processing of a timeslot must be completed within 500 µs. Load spikes in processing may occur when additional user equipment devices (UEs) attach to the vRAN or begin sending or receiving data with the vRAN. Generally, load spikes for a few UEs are manageable by distributing the corresponding processing across multiple processors or servers of a current resource allocation, but in some scenarios, these load spikes overwhelm the current resource allocation before additional resources can be allocated and these real-time deadlines are missed.

In examples described herein, an autoscale processor is configured to change the allocations of computing resources for a vRAN and also determine wireless parameter limits for wireless communication channels served by the vRAN that constrain utilization of the allocated computing resources. Resource load for PHY processing is closely related to wireless parameters for the wireless communication channels, such as a modulation and coding scheme (MCS), a number of connected UEs, a number of resource units (RUs), etc. As one example, PHY processing for a timeslot using a high complexity MCS such as 1024 Quadrature Amplitude Modulation (QAM) may correspond to a resource load of 1 gigaFLOPS (GFLOPS, floating point operations per second) from a processor (or distributed across multiple processors), while using a lower complexity MCS such as 256 QAM may correspond to a resource load of 0.25 GFLOPS. Accordingly, a load spike of 1 GFLOPS for a UE may be limited to 0.25 GFLOPS by using a wireless parameter limit of 256 QAM (i.e., restricting or denying use of 512 QAM and 1024 QAM). By constraining the utilization of the allocated computing resources, load spikes that cause a violation of the real-time deadlines for PHY processing are reduced or entirely avoided. In some examples, the allocation of computing resources may be reduced further, allowing for reduced power requirements or operating costs (e.g., electricity costs, datacenter cooling costs) of the vRAN. This and many further embodiments for a computing device are described herein.

FIG. 1 illustrates an overview of an example system 100 in which changing allocations of computing resources in a vRAN may be implemented. A mobile wireless telecommunication network, such as the system 100, may use a cloud service for implementing a RAN. In this case, the cloud service connects cell towers, with which mobile devices (e.g., smartphones) connect, to the public network (e.g., the Internet), telecommunication networks, private networks, or other suitable networks. The cloud service provides virtual servers and other computing resources for dynamically scaling the computing capacity as needed based on the volume of data traffic (e.g., to and from the mobile devices). In aspects, a cloud RAN infrastructure represents an implementation of cloud services for the RAN. In contrast to a typical cloud service, the cloud RAN infrastructure may include geographical and physical constraints as well as latency constraints imposed by RAN standards. The cloud RAN infrastructure includes connection to at least one cell tower associated with an RU and cloud servers associated with one or more of a distributed unit (DU), a central unit (CU), and a RAN intelligent controller (RIC). The cell tower is in the field, where mobile devices connect over wireless cellular communications, and the RU of the cell tower connects to a DU of a RAN server at a far-edge datacenter. To enable real-time processing of RAN data traffic, the far-edge datacenter is relatively close (e.g., a few kilometers) to the cell tower.

As noted above, the DU is associated with network switches and processes data in a series of operations associated with at least layer one (physical layer, L1) and layer two (data link layer, L2) of the Open Systems Interconnection (OSI) model. The physical layer connects a data link layer device (e.g., medium access control (MAC)) to a physical medium (e.g., optical fiber, copper cable, etc.). In aspects, a switch is a hardware device that connects devices on a digital network by using packet switching to receive and forward data to a destination device. Some switches include integrated circuit chips programed to process packets according to fixed rules associated with a limited set of networking protocols. Other switches are programmable based on a protocol independent switch architecture which enables developers to program each stage of packet processing.

In the example embodiment shown in FIG. 1, cell towers 102A-C transmit and receive wireless communications with mobile computing devices (e.g., smartphones) over a RAN. The example system 100 further includes a far-edge datacenter 110 (switches, RAN servers), a near-edge datacenter 130 (core network servers), and a cloud datacenter 150 (cloud services). In aspects, the example system 100 corresponds to a cloud RAN infrastructure for a mobile wireless telecommunication network.

The far-edge datacenter 110 includes a DU 112 and a CU 118. In aspects, the far-edge datacenter 110 enables cloud integration with a RAN. The far-edge datacenter 110 includes a switch 114 and RAN servers 116 configured to host vRAN instances 120 for processing RAN data traffic. A vRAN is a type of RAN in which networking functions (including the control and data planes) are separated from the hardware that hosts the vRAN (e.g., RAN servers 116 host the vRAN instances 120). In general, network function virtualization involves enabling software to perform hardware-based functions. This leads to increased responsiveness to network fluctuations and increased flexibility for enhancement since software can be upgraded or repaired more easily than hardware.

The switch 114 and RAN servers 116 process incoming data traffic and outgoing data traffic associated with a layer one or physical (PHY) layer 174 and at least a part of a layer two or medium access control (MAC) layer 176. In aspects, the far-edge datacenter 110 is at a remote site from the cloud datacenters associated with the core network and cloud services. For example, the remote site may be located within a few kilometers or more of the cell towers 102A-C. In aspects, the upstream data traffic corresponds to data flowing from the cell towers 102A-C to servers 154 in the cloud datacenter 150. Similarly, the downstream data traffic corresponds to data flowing from the cloud datacenter 150 to the cell towers 102A-C.

The near-edge datacenter 130 (e.g., hosting the core network) includes a CU 132 and a RAN intelligent controller 136 (RIC). The CU 132 is associated with servers 134 and the RIC 136 is associated with servers 138. In aspects, the near-edge datacenter 130 is at a regional site of a private cloud service. For example, the regional site may be located tens of kilometers from the cell towers 102A-C.

The cloud datacenter 150 includes a RIC 152 associated with the servers 154. For example, the RIC 152 processes non-real-time service operations. In aspects, the cloud datacenter 150 may be at a central location in the cloud RAN infrastructure. For example, the central locations may be located hundreds of kilometers from the cell towers 102A-C. In aspects, the far-edge datacenter 110, which is closer to the cell towers 102A-C than the cloud datacenter 150, provides real-time processing. In contrast, the cloud datacenter 150, which is furthest from the cell towers 102A-C in the cloud RAN infrastructure, provides processing in a non-real-time manner.

Operational partitions 170 illustrate various operational segments for processing data traffic in the RAN. For example, operational partitions 182-191 may correspond to the layer one 174 processing and operational partitions 192-195 may correspond to the layer two 176 processing of the OSI seven-layer model.

In aspects, conversion of data associated with a radio frequency (RF) 172 occurs prior to processing data at the layer one 174. For data processing of the RF 172, the radio front-end partition receives and sends data through the cell towers 102A-C to mobile computing devices over wireless communications. An analog to digital converter (A/D) 181A converts analog data from the radio front-end to digital data for the upstream data traffic. A digital to analog converter (D/A) 181B converts digital data into analog data for the downstream data traffic. In aspects, the interface between the DU and RU in a cloud RAN is referred to as "fronthaul." The fronthaul defines various "planes" of operations including the "c-plane" (control plane), "u-plane" (user plane), "s-plane" (synchronization plane), and "m-plane" (management plane). In general, c-plane data are directed to scheduling and coordination of data transmission, u-plane data are directed to efficient data transfer, s-plane data are directed to timing and synchronization of data transmission between the RU and DU, and m-plane data relate to managing the RU. Packets having data payloads related to the different planes of operation include corresponding header information (e.g., a "c-plane header," "u-plane header," etc.).

Partitions in the layer one 174 are related to operations for converting coded symbols associated with a bit stream into a physical signal for transmission using communication media (e.g., a physical wire or radio). For example, the layer one 174 may convert coded symbols into in-phase/quadrature (IQ) signals. In aspects, the operational partitions for processing upstream data traffic of the layer one 174 may include CP 182A, FFT 183A, Demap 184A, Channel 185A, Eq 186A, Demod 187A, Descram 188A, Rate 189A, Decoding 190A, and CRC 191A. In aspects, the operational partitions for processing downstream data traffic in the layer one 174 may include CRC 191B, Coding 190B, Rate 189B, Scram 188B, Mod 187B, Layer 186B, Precode 185B, Map 184B, iFFT 183B, and CP 182B.

Partitions in the layer two 176 are related to operations for transferring data frames between network hosts over a physical link. In aspects, partitions in the layer two 176 correspond to the data link layer in the OSI seven-layer model. For example, low-MAC 192 is the lowest partition in the layer two 176. Other partitions above the low-MAC 192 include an ascending sequence of layers, high-MAC 193, low-radio link control (RLC) 194, and high-RLC 195.

Partitions in layer three 178 are related to operations for forwarding data packets through routers. In aspects, the layer three 178 corresponds to the network layer in the OSI seven-layer model. The partitions in the layer three 178 may be associated with protocol-governed operations such as packet data convergence protocol 196 (PDCP), radio resource control 197A (RRC) and service data adaptation protocol 197B (SDAP).

In aspects, a combination of the DU 112 and CU 118 in the far-edge datacenter 110 may process partitions associated with the layer one 174, the layer two 176, and at least a part of the layer three 178. In particular, respective servers of the RAN servers 116 may include various computing resources, such as one or more processors, memory configured to store data for the processors (e.g., RAM or other suitable storage devices, not shown), network interface devices for exchanging packets with the switch 114 or servers 134, a variety of accelerators for processing data associated with one or more partitions of the operational partitions 170, graphics processing units (e.g., for parallel floating point operations), or other suitable computing resources.

As will be appreciated, the various methods, devices, applications, features, etc., described with respect to FIG. 1 are not intended to limit the example system 100 to being performed by the particular applications and features described. Accordingly, additional controller configurations may be used to practice the methods and systems herein or features and applications described may be excluded without departing from the methods and systems disclosed herein.

Figure 2A:
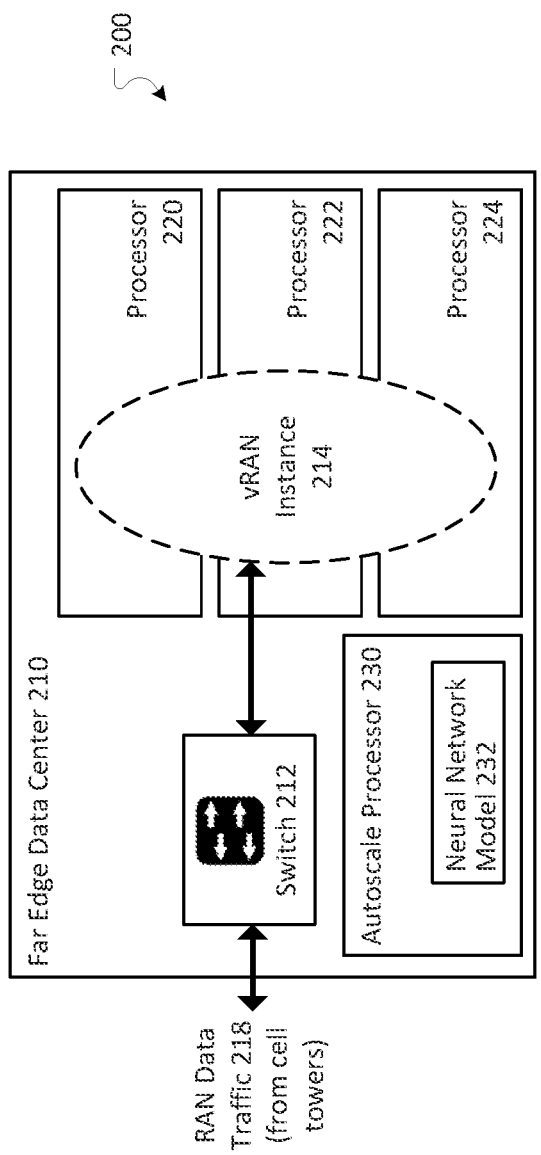
Figure 2B:
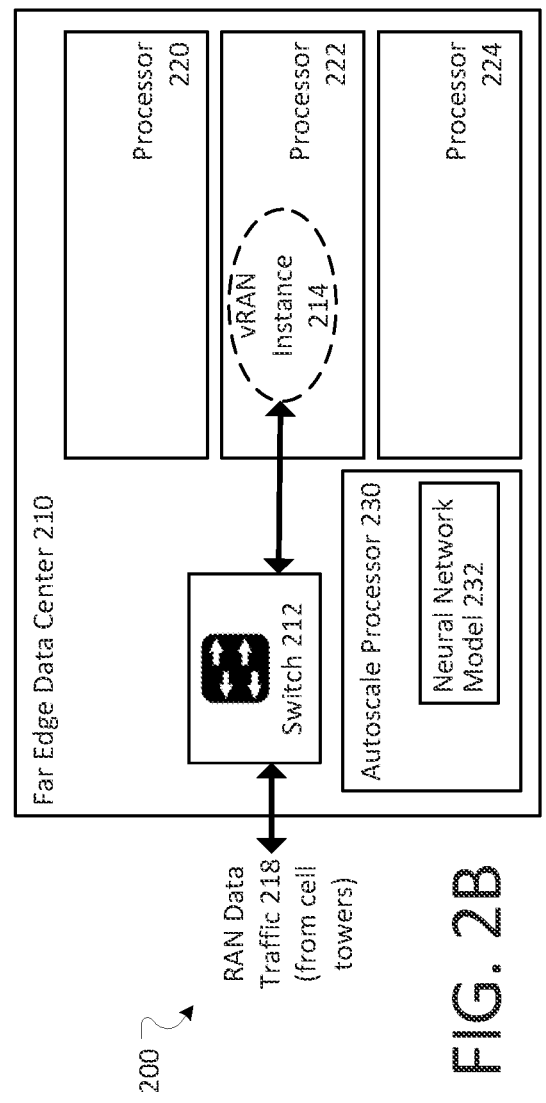

FIG. 2A illustrates a first example of a far-edge datacenter 210 of RAN environment 200. The far-edge datacenter 210 (generally corresponding to far-edge datacenter 110) includes at least a switch 212, a vRAN instance 214, and computing resources, such as processors 220, 222, and 224. The processors 220, 222, and 224 may be located in a same RAN server or different RAN servers (e.g., RAN servers 116) in different examples. In the case of FIG. 2A, the switch 212 (corresponding to switch 114) connects the cell towers (e.g., the cell towers 102A-C, as shown in FIG. 1) with computing resources allocated to run the vRAN instance 214, specifically in this example, the processors 220, 222, and 224. In other examples, other computing resources (e.g., one or more of memory, network interface devices, accelerators, or other suitable computing resources) may be similarly allocated. In the examples of FIGS. 2A and 2B, available computing resources of the far-edge datacenter 210 include the processors 220, 222, and 224, but a subset of these available computing resources may be allocated at various times, as described below.

In some examples, the vRAN instance 214 is implemented as one or more independent software modules (e.g., Docker containers) for performing portions of RAN data traffic processing, such as a PHY module, a MAC module, etc. A PHY module may be configured to perform PHY processing for RAN data traffic for a plurality of UEs connected to the vRAN instance 214, while a MAC module may be configured to perform MAC processing for the RAN data traffic. In some examples, a single PHY module and a single MAC module implement a distributed unit (DU) of the vRAN instance 214.

Although allocations of computing resources for Docker containers may be managed by existing software packages, such as Kubernetes, these packages generally do not provide changes in allocations within a suitable time period, specifically, within the timing constraints of a vRAN instance. In the disclosed system, the far-edge datacenter 210 includes an autoscale processor 230 configured to dynamically allocate computing resources to vRAN instances within the far-edge datacenter 210, while still meeting the timing constraints of a vRAN instance. In various examples, the autoscale processor 230 is implemented as an application specific integrated circuit (ASIC), a software module (e.g., autoscale module 336) executed by a hardware processor, a software service, a firmware module, or other suitable implementation.

In the example shown in FIG. 2A, the autoscale processor 230 has allocated the processors 220, 222, and 224 to the vRAN instance 214. Different allocations may be based on real-time network information, configuration parameters of the vRAN, a volume of the RAN data traffic 218 (e.g., an average over a prior period(s)), or other suitable information. As described further below, as a volume of RAN data traffic 218 fluctuates (e.g., during peak mobile usage periods during the day, or low usage at night), the autoscale processor 230 dynamically allocates computing resources to the vRAN instance 214 within the timing constraints of the vRAN instance 214. As a result, with improved computing resource allocation, RAN processing efficiency and energy efficiency of the RAN servers 116 may improve—even in instances of changing network conditions and spikes in RAN data traffic 218.

In the example shown in FIG. 2B, the autoscale processor 230 has allocated the processor 222 to the vRAN instance 214. For example, at night during a period of reduced resource load, a single processor may be sufficient to perform RAN data traffic processing. In some examples, the autoscale processor 230 allocates a remainder of the available computing resources for an alternate processing mode. In other words, the remainder (i.e., processor 220 and 224) may be allocated to the alternate processing mode.

In some examples, the alternate processing mode is a power saving mode where the processors, portions thereof (e.g., individual cores of a multi-core processor), or related equipment (e.g., motherboards, power supplies, etc.) have reduced electrical power consumption. The power saving mode may be implemented by executing NO OP instructions, entering a power save state, or other suitable operation. The power saving mode may reduce operating costs (e.g., electricity costs, datacenter cooling costs) of the far-edge datacenter 210 as compared to datacenters without an autoscale processor. In other examples, the alternate processing mode is a mode configured for other processing tasks to be performed by the far-edge datacenter 210. In this alternate processing mode, additional processing may be performed that otherwise would not be possible without the autoscale processor 230.

Although FIGS. 2A and 2B refer to changing an allocation of processors as the allocation of computing resources for the vRAN instance 214, in other examples, the computing resources include one or more of memory, network interface devices, accelerators, or other suitable computing resources. Moreover, the autoscale processor 230 may allocate computing resources separately to individual software modules (e.g., a PHY module, a MAC module), allocate computing resources in groups (e.g., for a linked PHY module and MAC module), or other suitable grouping.

In addition to determining an allocation of computing resources, the autoscale processor 230 is configured to determine wireless parameter limits for wireless communication channels served by the vRAN to constrain utilization of the allocated computing resources (e.g., for PHY processing). As described above, by constraining the utilization of the allocated computing resources with the wireless parameter limits, load spikes that cause a violation of the real-time deadlines for PHY processing are reduced or entirely avoided. In some examples, the allocation of computing resources may safely be reduced further, allowing for reduced power requirements or operating costs (e.g., electricity costs, datacenter cooling costs) of the vRAN. Examples of wireless parameters that may be limited by the autoscale processor 230 include a MCS index (or a modulation scheme or coding scheme separately), a number of connected UEs (e.g., limited to 200 UEs instead of 250 UEs), a number of RUs per timeslot (e.g., RUs corresponding to 20 MHz of bandwidth instead of 100 MHz), a transport block size (TBS), or other suitable wireless parameters.

In some examples, the autoscale processor 230 is configured to determine a predicted resource load for PHY processing. As described above, the allocation of computing resources may be reduced, but an excessive reduction may result in poor performance of the vRAN. The autoscale processor 230 is configured to predict a resource load for the RAN data traffic processing, for example, based on current RAN data traffic, network configuration, a number of connected UEs, wireless parameters or conditions (e.g., time of day, day of week), bandwidth requested by UEs, and other suitable information.

In the example shown in FIG. 2A, the autoscale processor 230 includes a neural network model 232 that may be configured for online or offline learning to predict the resource load using the above-mentioned information. Generally, the neural network model 232 is configured to learn to conservatively predict the resource load to avoid drops in service (e.g., not meeting a PHY processing deadline). In some examples, the neural network model 232 is implemented as a recurrent neural network model, such as a long short term memory (LSTM) model, that performs a time series prediction. The neural network model 232 takes history into account, extracts patterns, then predicts future trends in resource load. In some examples, the neural network model 232 predicts a resource load as a volume of bandwidth within the RAN data traffic to be processed, a number of processors (or processor cores) predicted as needed to process the RAN data traffic, an amount of memory predicted as needed to process the RAN data traffic, or other suitable indications of resource load.

Figure 3:
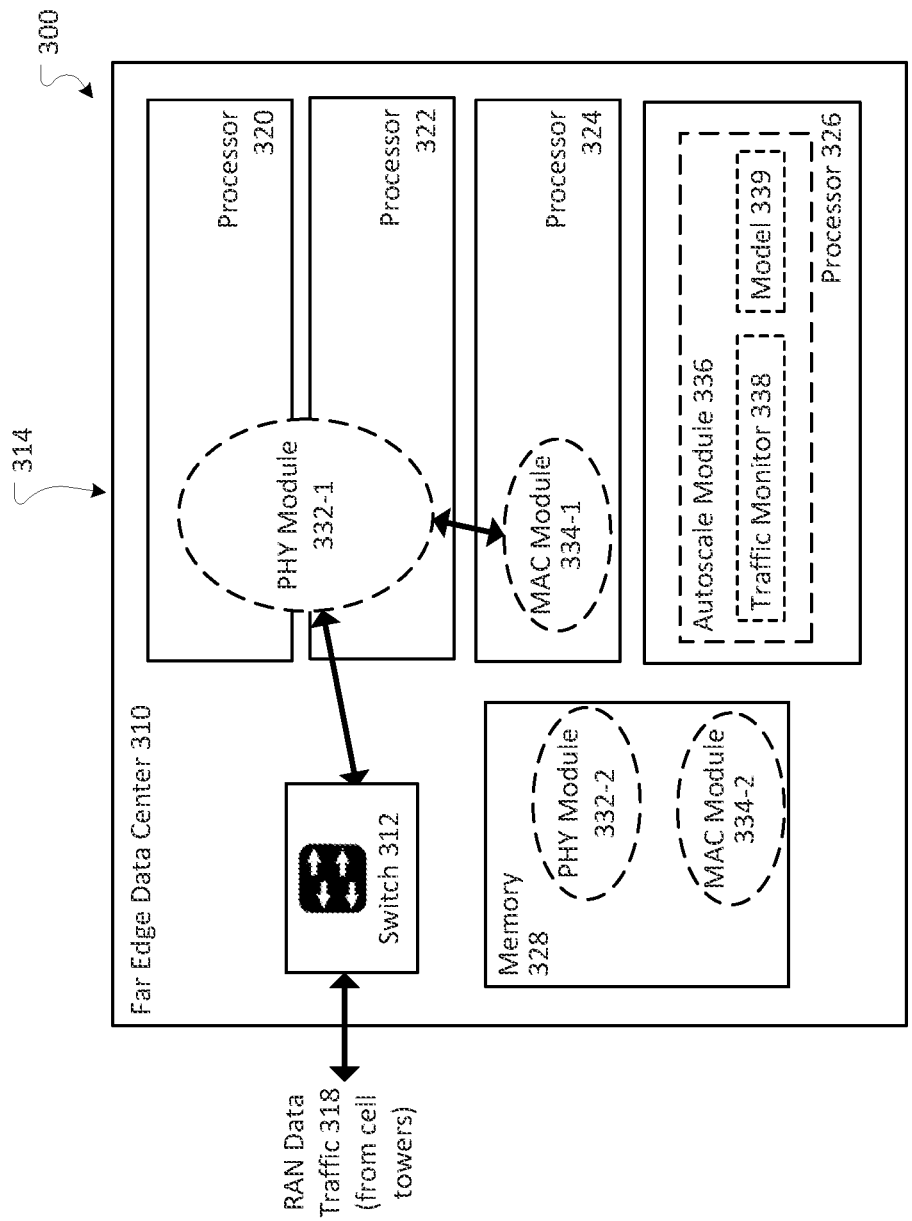

In some examples, the neural network model 232 is trained in an offline mode using existing data about one or more vRAN instances 120. For generation of the data, the autoscale processor 230 may enforce wireless parameter limits, monitor the RAN data traffic, monitor other network information (e.g., network parameters, UE parameters such as a number of connected UEs, priority levels, etc.), and store suitable data for training. Based on the offline training, the autoscale processor 230 may provide similar data (e.g., network parameters, UE parameters) from a current timeslot of the vRAN instance to the neural network model 232 and receive the current predicted resource load in near real-time, as described above. In this way, the autoscale processor 230 is able to more quickly make allocation decisions for the vRAN instance. In some examples, the neural network model 232 is iteratively trained by performing further offline training sessions using more recent training data. Monitoring of the RAN data traffic and network information may be performed by a traffic monitor, such as traffic monitor 338 (FIG. 3).

The neural network model 232 may also be trained using an online learning algorithm that makes controlled decisions in real-time. In other words, the neural network model 232 may use a reinforcement learning algorithm to use feedback for how the wireless parameter limits are affecting an actual resource load of the vRAN instance. As described above, this enables the autoscale processor 230 to make allocation decisions more quickly and with lower allocations than prior systems. More specifically, due to occasional spikes in RAN data traffic, an allocation of ten processors may be needed by a prior art system to meet the PHY processing time limits, but by using the wireless parameter limits and learning their effects on PHY processing, the neural network model 232 may allow the autoscale processor 230 to allocate eight processors with suitable wireless parameter limits and still meet the PHY processing time limits and handling the occasional spikes in RAN data traffic.

In alternate examples, the autoscale processor 230 includes a first module that predicts UE bandwidth requests and a second module that predicts resource load based on the UE bandwidth requests. As another example, the autoscale processor 230 may implement a decision tree predictor that, given a workload profile for a current timeslot, predicts a suitable resource load for processing the workload profile.

Generally, autoscaling of the computing resources refers to increasing or reducing processing capacity for the vRAN instance, but does not necessarily increase throughput for a particular UE. For example, autoscaling could result in reduced throughput to individual UEs (e.g., by enforcing a reduced MCS), but allow for an increased number of RUs such that a total resource load is increased on the allocated resources.

FIG. 3 illustrates an example of a far-edge datacenter 310 of RAN environment 300, according to an embodiment. The far-edge datacenter 310 (generally corresponding to far-edge datacenter 110) includes at least a switch 312 and available computing resources, such as processors 320, 322, 324, and 326 and memory 328. The processors 320, 322, 324, and 326 may be located in a same RAN server or different RAN servers (e.g., RAN servers 116) in different examples. In the case of FIG. 3, the switch 312 (corresponding to switch 212) connects the cell towers (e.g., the cell towers 102A-C, as shown in FIG. 1) with computing resources allocated to run a vRAN instance 314. In this example, the vRAN instance 314 is similar to the vRAN instance 214 but is implemented using a PHY module 332 and a MAC module 334. The PHY module 332 and MAC module 334 may be Docker containers or other suitable software modules for performing PHY processing and MAC processing within a vRAN.

The far-edge datacenter 310 includes an autoscale module 336, which is generally similar to the autoscale processor 230, but implemented as a software module on the respective RAN servers. In this example, the autoscale module 336 is executable using the same available computing resources as the vRAN instance 314. In the example shown in FIG. 3, the autoscale module 336 executes on the processor 326, allocates processors 320 and 322 and a first portion of memory 328 to the PHY module 332, and allocates processor 324 and a second portion of memory 328 to the MAC module 334. The autoscale module 336 is shown in FIG. 3 as a separate module. However, in other examples, the autoscale module 336 is implemented as a portion of a vRAN scheduling module, a MAC scheduling module (e.g., within the MAC module 334), a RAN intelligent controller (e.g., RIC 136), or other suitable scheduler for computing resources.

The autoscale module 336 may also include a traffic monitor 338 and a neural network model 339, in various examples. The traffic monitor 338 is configured to monitor RAN data traffic, network information, wireless parameters, or other suitable information for training the neural network model 339, determining predicted resource loads, providing inputs to the neural network model 339, or other suitable purposes. The neural network model 339 generally corresponds to the neural network model 232.

In some examples, the autoscale module 336 communicates with the PHY module 332 to cause the PHY module to provide a modified characteristic of the wireless communication channels to the MAC module 334. The modified characteristic may be a signal to noise ratio, signal strength indication, or other suitable characteristic. The autoscale module 336 causes the PHY module 332 to modify the characteristic to induce the MAC module 334 to use the wireless parameter limits. For example, when the PHY module 332 provides an SNR value of 90 dB to the MAC module 334, indicating a relatively strong signal, the MAC module 334 may select a more complex MCS value corresponding to a 1024 QAM. When the PHY module 332 provides a modified SNR value of 75 dB to the MAC module 334 even when the SNR is actually 90 dB, the MAC module 334 may select a less complex MCS value corresponding to a 256 QAM. Accordingly, the modified characteristic (SNR value) causes the MAC module 334 to enforce a wireless parameter limit (e.g., restricting or denying use of 512 QAM and 1024 QAM). In other examples, the autoscale module 336 or another suitable module (not shown) modifies a message (e.g., FAPI message or nFAPI message) sent between the PHY module 332 and the MAC module 334 to modify the characteristic of the wireless communication channels and cause the MAC module 334 to enforce the wireless parameter limit.

Figure 4:
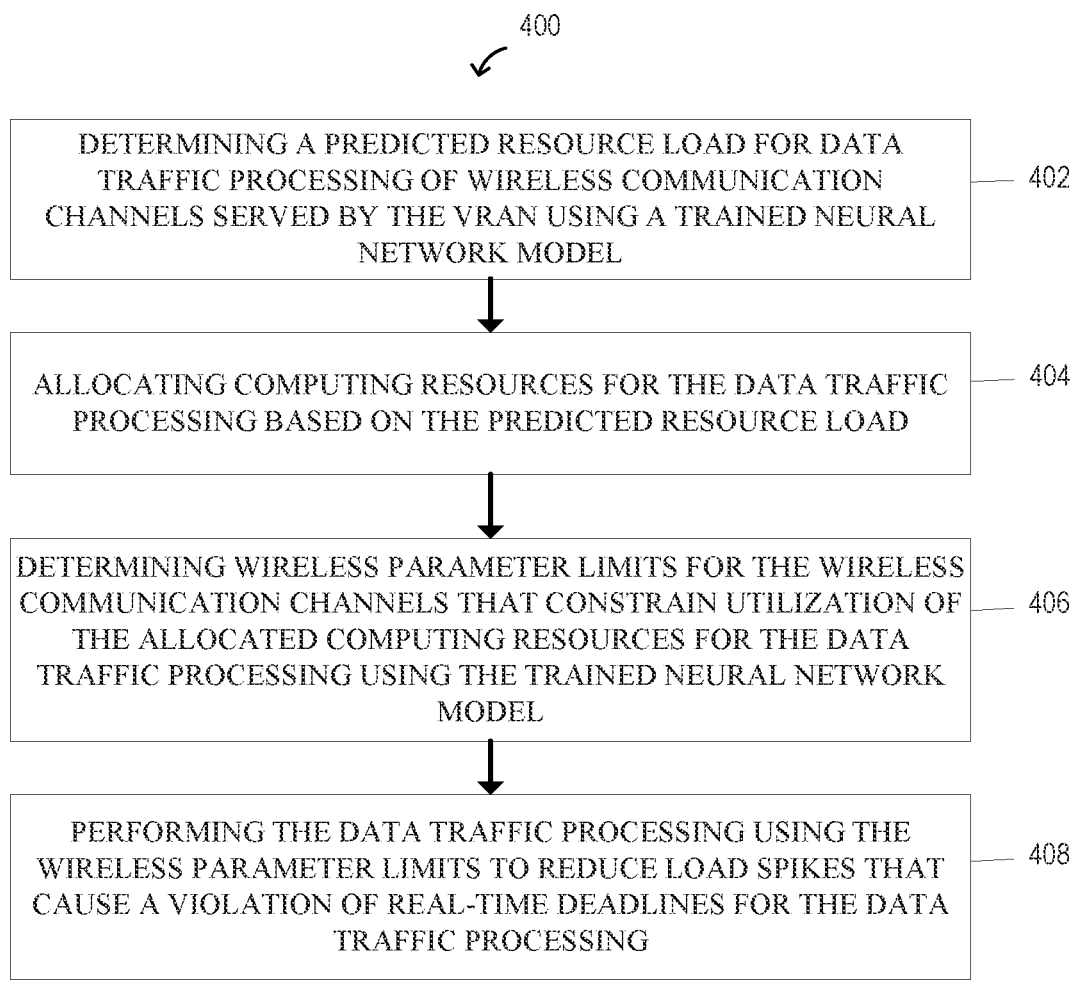
FIG. 4 shows a flowchart of an example method of changing allocations of computing resources in a virtualized radio access network, according to an example embodiment.

FIG. 4 shows a flowchart of an example method 400 of utilizing computing resources in a virtualized radio access network (vRAN), according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 4. Steps may be performed serially, in a partially overlapping manner, or fully in parallel. Thus, the order in which steps of method 400 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 4 may be performed by the far-edge datacenter 210 (e.g., via the autoscale processor 230), the far-edge datacenter 310 (e.g., via the autoscale module 336), or other suitable computing device.

Method 400 begins with step 402. At step 402, a predicted resource load is determined for data traffic processing of wireless communication channels served by the vRAN. The predicted resource load is determined by the neural network model 232 or the neural network model 339, in various examples. Step 402 may include providing network parameters and usage data for the vRAN to a trained neural network model, such as the neural network models 232 or 339. In some examples, the data traffic processing comprises physical layer (PHY) data processing or medium access control layer (MAC) processing.

At step 404, computing resources are allocated for the data traffic processing based on the predicted resource load. The computing resources may be one or more of processors (e.g., processors 220, 222, 224, 320, 322, 324, 326), memory (e.g., memory 328), or servers (e.g., RAN servers 116). In some examples, the autoscale processor 230 allocates processors, such as the processors 220, 222, or 226. In some examples, step 404 includes allocating a subset of available computing resources for the data traffic processing and allocating a remainder of the available computing resources for an alternate processing mode. In some examples, the alternate processing mode is a power saving mode having reduced power consumption relative to the data traffic processing. In some examples, the autoscale processor 230 uses a conversion tool that predicts an allocation of resources based on a given resource load. In other examples, the neural network model 232 outputs the allocation of resources.

At step 406, wireless parameter limits are determined for the wireless communication channels that constrain utilization of the allocated computing resources for the data traffic processing. The wireless parameter limits may include one or more of an MCS index, a modulation scheme, a coding scheme, a number of connected UEs, a number of RUs per timeslot, or other suitable limits. As one example, step 406 may include setting a maximum number of radio resource units (RUs) per timeslot for the wireless parameter limits. As another example, step 406 may include setting a maximum modulation and coding scheme (MCS) index for the wireless parameter limits. As yet another example, step 406 may include setting a maximum number of user equipment devices for which the data traffic processing is performed for the wireless parameter limits.

At step 408, the data traffic processing is performed using the wireless parameter limits. In some examples, step 408 includes performing medium access control layer (MAC) scheduling using the wireless parameter limits.

In some examples, step 402 includes determining the predicted resource load for a next periodic frame interval of the vRAN (e.g., a next 10 ms frame interval). In these examples, the method 400 includes: determining the wireless parameter limits comprises determining the wireless parameter limits for the next periodic frame interval; and performing the data traffic processing using the wireless parameter limits for the next periodic frame interval.

In some examples, the method 400 also includes setting the wireless parameter limits, monitoring the data traffic processing while using the wireless parameter limits to obtain training data, and training the trained neural network model to generate the predicted resource loads using the training data. Training the neural network model may correspond to training the neural network model 232, as described above.

Figure 5:
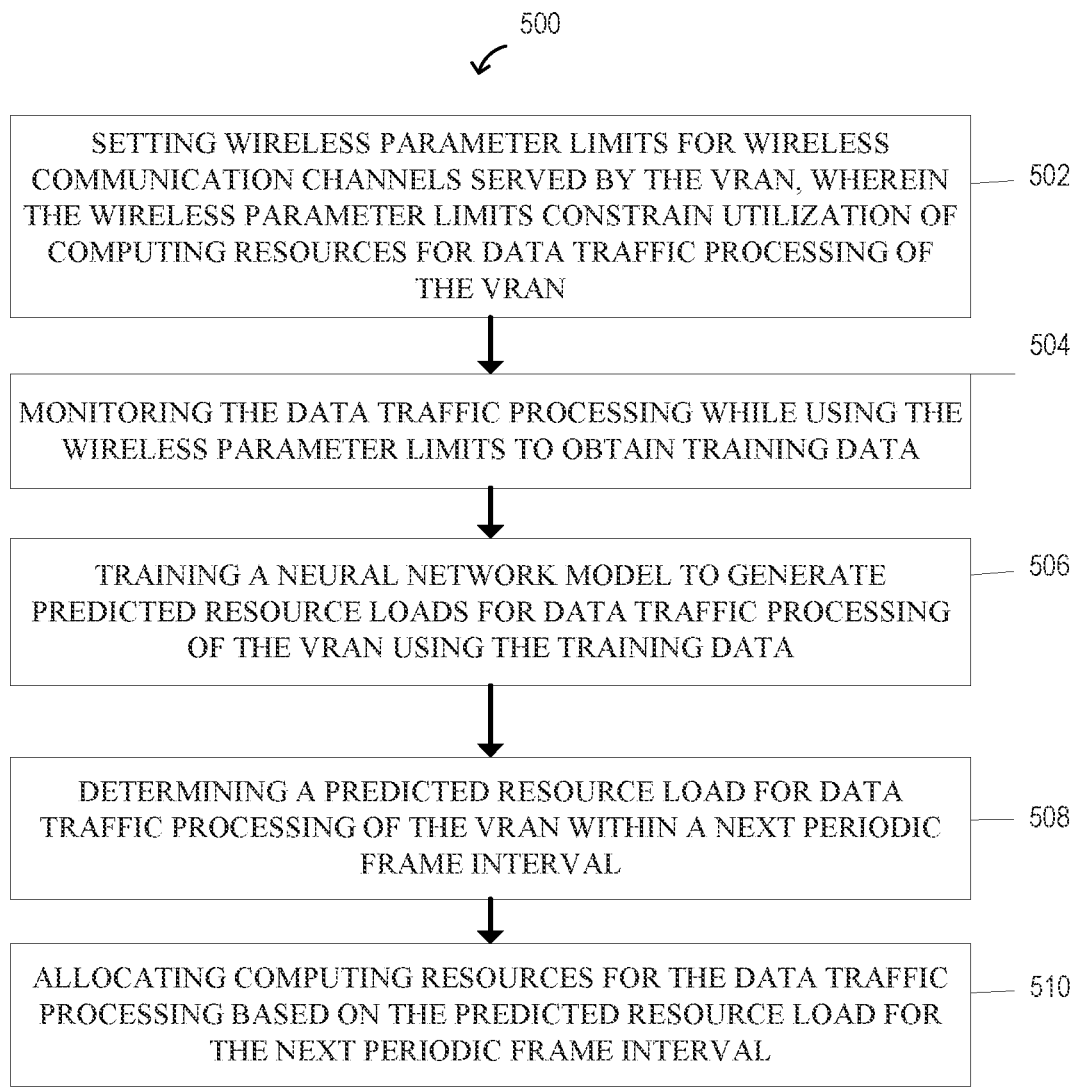
FIG. 5 shows a flowchart of an example method of changing allocations of computing resources in a virtualized radio access network, according to an example embodiment.

FIG. 5 shows a flowchart of an example method 500 of utilizing computing resources in a virtualized radio access network (vRAN), according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by the far-edge datacenter 210 (e.g., via the autoscale processor 230), the far-edge datacenter 310 (e.g., via the autoscale module 336), or other suitable computing device.

Method 500 begins with step 502. At step 502, wireless parameter limits are set for wireless communication channels served by the vRAN. The wireless parameter limits constrain utilization of computing resources for data traffic processing of the vRAN and the data traffic processing may include physical layer (PHY) data processing or medium access control layer (MAC) processing for a 5G radio access network. For example, the autoscale processor 230 identifies and enforces the wireless parameter limits. Examples of wireless parameters that may be limited by the autoscale processor 230 include a MCS index (or a modulation scheme or coding scheme separately), a number of connected UEs (e.g., limited to 200 UEs instead of 250 UEs), a number of RUs per timeslot (e.g., RUs corresponding to 20 MHz of bandwidth instead of 100 MHz), or other suitable wireless parameters. In some examples, step 502 includes setting one or more of a maximum number of radio resource units (RUs) per timeslot and a maximum modulation and coding scheme (MCS) index for the wireless parameter limits. In some examples, the method 500 also includes performing medium access control layer (MAC) scheduling using the wireless parameter limits. For example, the autoscale module 336 provides the wireless parameter limits to the MAC module 334.

At step 504, the data traffic processing is monitored while using the wireless parameter limits to obtain training data. In some examples, step 504 includes monitoring one or more of network parameters, user equipment parameters, and usage data of the vRAN. Step 504 may be performed by the traffic monitor 338. The usage data may include one or more of a number of user equipment (UEs) scheduled and a data traffic bandwidth requested by the scheduled UEs.

At step 506, a neural network model is trained to generate predicted resource loads for data traffic processing of the vRAN using the training data. In some examples, the neural network model generally corresponds to the neural network model 232 or the neural network model 339. The neural network model may be trained in an offline mode using existing data about one or more vRAN instances 120 or in an online mode using a reinforcement learning algorithm, as described above.

At step 508, a predicted resource load is determined for data traffic processing of the vRAN within a next periodic frame interval. For example, the autoscale processor 230 determines the predicted resource load based on current RAN data traffic, network configuration, a number of connected UEs, wireless parameters or conditions (e.g., time of day, day of week), bandwidth requested by UEs, and other suitable information, as described above.

At step 510, computing resources for the data traffic processing are allocated based on the predicted resource load for the next periodic frame interval. In some examples, the autoscale processor 230 uses a conversion tool that predicts an allocation of resources based on a given resource load. In other examples, the neural network model 232 outputs the allocation of resources.

In some examples, the method 500 also includes: updating the wireless parameter limits for the wireless communication channels based on the predicted resource load; and performing the data traffic processing using the wireless parameter limits for the next periodic frame interval.

Figure 6:
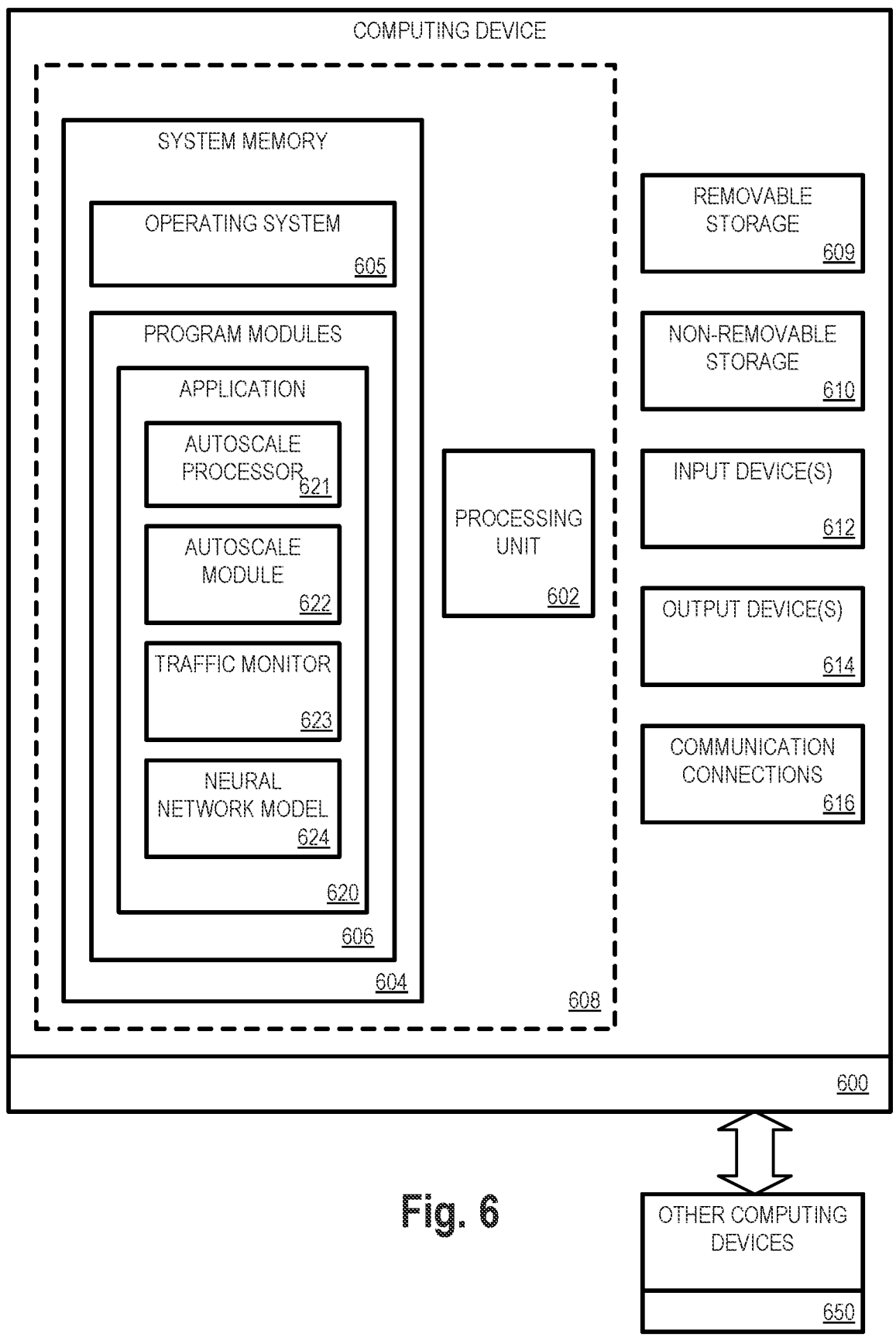
FIG. 6 is a block diagram illustrating example physical components of a computing device with which aspects of the disclosure may be practiced.
Figure 7:
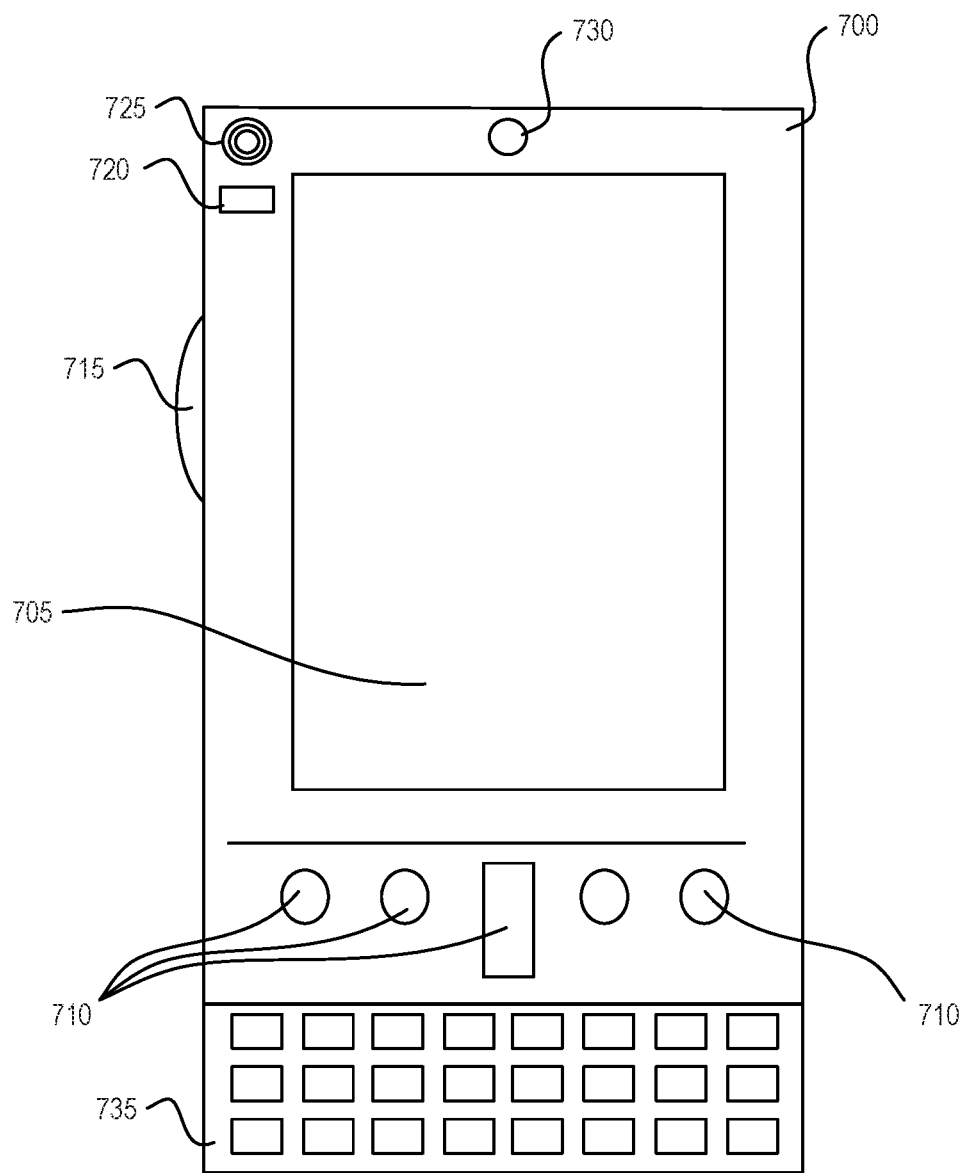
FIGS. 7 and 8 are simplified block diagrams of a mobile computing device with which aspects of the present disclosure may be practiced.
Figure 8:
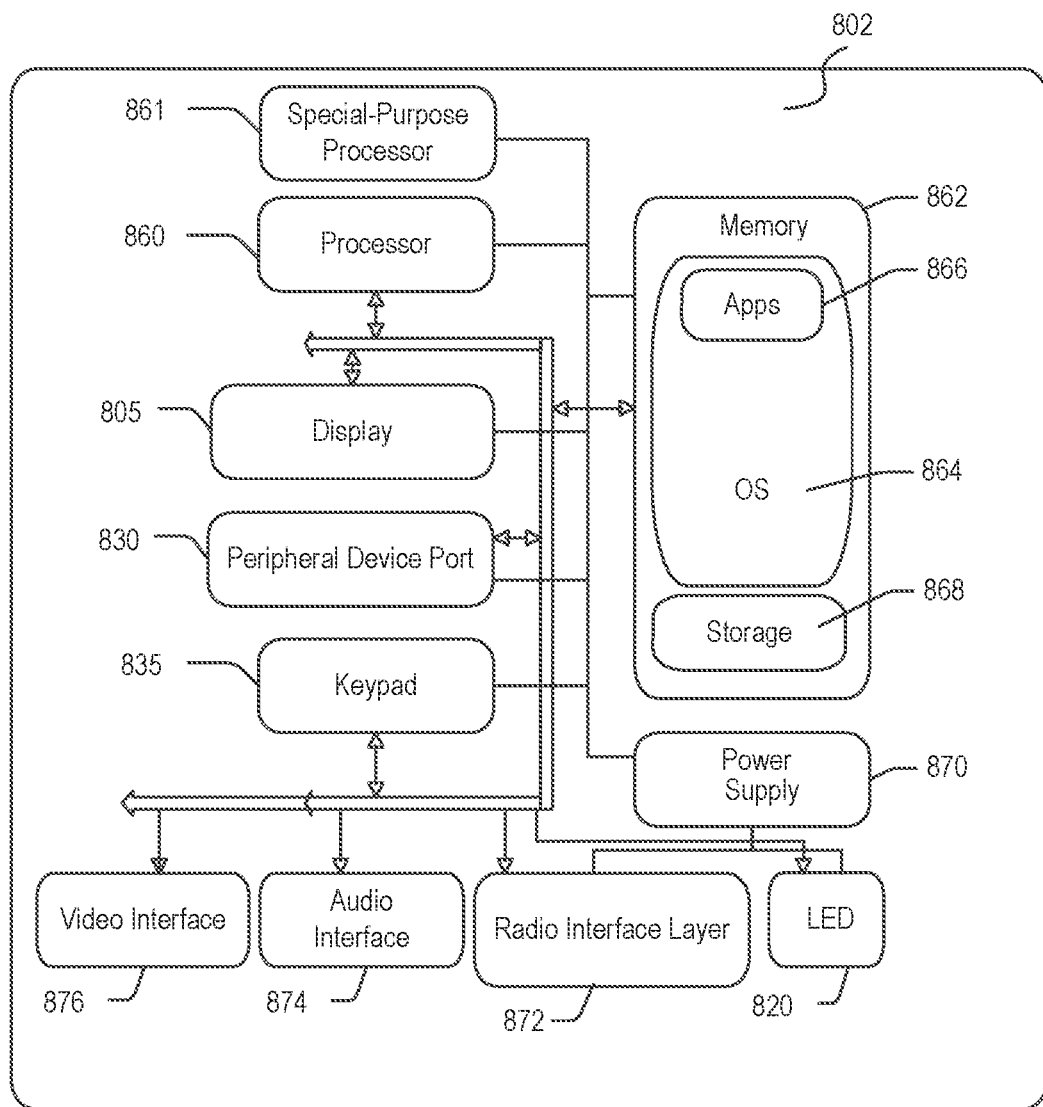

FIGS. 6, 7, and 8 and the associated descriptions provide a discussion of a variety of operating environments in which aspects of the disclosure may be practiced. However, the devices and systems illustrated and discussed with respect to FIGS. 6, 7, and 8 are for purposes of example and illustration and are not limiting of a vast number of computing device configurations that may be utilized for practicing aspects of the disclosure, as described herein.

FIG. 6 is a block diagram illustrating physical components (e.g., hardware) of a computing device 600 with which aspects of the disclosure may be practiced. The computing device components described below may have computer executable instructions for implementing a resource allocation application 620 on a computing device (e.g., RAN server 116, far-edge datacenter 210 or 310), including computer executable instructions for resource allocation application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running resource allocation application 620, such as one or more components with regard to FIGS. 1, 2A, 2B, and 3 and, in particular, autoscale processor 621 (e.g., corresponding to autoscale processor 230), autoscale module 622 (e.g., corresponding to autoscale module 336), traffic monitor 623 (e.g., corresponding to traffic monitor 338), and neural network model 624 (e.g., corresponding to neural network model 232 or 339).

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., resource allocation application 620) may perform processes including, but not limited to, the aspects, as described herein. Other program modules that may be used in accordance with aspects of the present disclosure, and in particular for changing allocations of computing resources in a virtualized radio access network (vRAN), may include autoscale processor 621, autoscale module 622, traffic monitor 623, and neural network model 624.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, or transceiver circuitry; universal serial bus (USB), parallel, or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7 and 8 illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), or an audio transducer 725 (e.g., a speaker). In some aspects, the mobile computing device 700 incorporates a vibration transducer for providing the user with tactile feedback. In yet another aspect, the mobile computing device 700 incorporates input or output ports, such as an audio input (e.g., a microphone jack), an audio output (e.g., a headphone jack), and a video output (e.g., a HDMI port) for sending signals to or receiving signals from an external device.

FIG. 8 is a block diagram illustrating the architecture of one aspect of a mobile computing device. That is, the mobile computing device 700 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer.

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, or an audio interface 874 may be used for producing audible notifications via an audio transducer 725 (e.g., audio transducer 725 illustrated in FIG. 7). In the illustrated embodiment, the visual indicator 820 is a light emitting diode (LED) and the audio transducer 725 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 700 implementing the system 802 may have additional features or functionality. For example, the mobile computing device 700 may also include additional data storage devices (removable or non-removable) such as, magnetic disks, optical disks, or tape. Such additional storage is illustrated in FIG. 8 by the non-volatile storage area 868.

Data/information generated or captured by the mobile computing device 700 and stored via the system 802 may be stored locally on the mobile computing device 700, as described above, or the data may be stored on any number of storage media that may be accessed by the device via the radio interface layer 872 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 7 and 8 are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for utilizing computing resources in a virtualized radio access network (vRAN) according to at least the examples provided in the sections below.

In an aspect, a method for utilizing computing resources in a virtualized radio access network (vRAN) is provided. The method includes determining a predicted resource load for data traffic processing of wireless communication channels served by the vRAN using a trained neural network model, wherein the data traffic processing comprises at least one of physical layer (PHY) data processing or medium access control layer (MAC) processing for a 5G radio access network; allocating computing resources for the data traffic processing based on the predicted resource load; determining wireless parameter limits for the wireless communication channels that constrain utilization of the allocated computing resources for the data traffic processing using the trained neural network model, including setting one or more of a maximum number of radio resource units (RUs) per timeslot or a maximum modulation and coding scheme (MCS) index for the wireless parameter limits; and performing the data traffic processing using the wireless parameter limits to reduce load spikes that cause a violation of real-time deadlines for the data traffic processing.

In some aspects, performing the data traffic processing comprises performing medium access control layer (MAC) scheduling using the wireless parameter limits.

In some aspects, allocating the computing resources comprises: allocating a subset of available computing resources for the data traffic processing; and allocating a remainder of the available computing resources for an alternate processing mode.

In some aspects, the computing resources are one or more of processors, memory, or servers.

In some aspects, the alternate processing mode is a power saving mode having reduced power consumption relative to the data traffic processing.

In some aspects, determining the predicted resource load comprises providing network parameters and usage data for the vRAN to the trained neural network model.

In some aspects, the trained neural network model is a long short term memory (LSTM) neural network model.

In some aspects, the method includes setting the wireless parameter limits; monitoring the data traffic processing while using the wireless parameter limits to obtain training data; training the trained neural network model to generate the predicted resource loads using the training data.

In some aspects, determining the wireless parameter limits comprises setting a maximum number of connected user equipment (UE) devices for the wireless parameter limits.

In some aspects, determining the wireless parameter limits comprises setting a maximum number of user equipment devices for which the data traffic processing is performed for the wireless parameter limits.

In some aspects, determining the predicted resource load comprises determining the predicted resource load for a next periodic frame interval of the vRAN; and the method further includes: determining the wireless parameter limits comprises determining the wireless parameter limits for the next periodic frame interval; and performing the data traffic processing using the wireless parameter limits for the next periodic frame interval.

In another aspect, a method for utilizing computing resources in a virtualized radio access network (vRAN) is provided. The method comprises setting wireless parameter limits for wireless communication channels served by the vRAN, including setting one or more of a maximum number of radio resource units (RUs) per timeslot and a maximum modulation and coding scheme (MCS) index for the wireless parameter limits, wherein the wireless parameter limits constrain utilization of computing resources for data traffic processing of the vRAN and the data traffic processing comprises physical layer (PHY) data processing or medium access control layer (MAC) processing for a 5G radio access network; monitoring the data traffic processing while using the wireless parameter limits to obtain training data; training a neural network model to generate predicted resource loads for data traffic processing of the vRAN using the training data; determining a predicted resource load for data traffic processing of the vRAN within a next periodic frame interval; and allocating computing resources for the data traffic processing based on the predicted resource load for the next periodic frame interval.

In some aspects, the method further includes updating the wireless parameter limits for the wireless communication channels based on the predicted resource load; and performing the data traffic processing using the wireless parameter limits for the next periodic frame interval.

In some aspects, monitoring the data traffic processing comprises monitoring one or more of network parameters, user equipment parameters, and usage data of the vRAN.

In some aspects, the usage data includes one or more of a number of user equipment (UEs) scheduled and a data traffic bandwidth requested by the scheduled UEs.

In some aspects, the method further includes performing medium access control layer (MAC) scheduling using the wireless parameter limits.

In yet another aspect, a system for utilizing computing resources in a virtualized radio access network (vRAN) is provided. The system comprises a plurality of processors configured to execute a vRAN instance and perform data traffic processing of wireless communication channels served by the vRAN instance, and an autoscale processor configured to: determine a predicted resource load for data traffic processing of wireless communication channels served by the vRAN instance, wherein the data traffic processing comprises physical layer (PHY) data processing or medium access control layer (MAC) processing for a 5G radio access network; allocate processors of the plurality of processors for the data traffic processing based on the predicted resource load; and determine wireless parameter limits for the wireless communication channels that constrain utilization of the allocated processors for the data traffic processing, including setting one or more of a maximum number of radio resource units (RUs) per timeslot and a maximum modulation and coding scheme (MCS) index for the wireless parameter limits. The allocated processors perform the data traffic processing using the wireless parameter limits.

In some aspects, the autoscale processor is configured to perform MAC scheduling using the wireless parameter limits.

In some aspects, the autoscale processor is configured to allocate a remainder of the plurality of processors for an alternate processing mode.

In some aspects, the autoscale processor includes a traffic monitor configured to provide network parameters and usage data for the vRAN to a trained neural network model of the autoscale processor that determines the predicted resource load.

Any of the one or more above aspects in combination with any other of the one or more aspect. Any of the one or more aspects as described herein.

What is claimed is:

1. A method for utilizing computing resources in a virtualized radio access network (vRAN), the method comprising:
    determining a predicted resource load for a data traffic processing of wireless communication channels served by the vRAN using a trained neural network model, wherein the data traffic processing comprises at least one of physical layer (PHY) data processing or medium access control layer (MAC) processing for a 5G radio access network;
    allocating computing resources for the data traffic processing based on the predicted resource load;
    determining wireless parameter limits for the wireless communication channels that constrain utilization of the allocated computing resources for the data traffic processing using the trained neural network model, including setting one or more of a maximum number of radio resource units (RUs) per timeslot or a maximum modulation and coding scheme (MCS) index for the wireless parameter limits; and
    performing the data traffic processing using the wireless parameter limits to reduce load spikes that cause a violation of real-time deadlines for the data traffic processing.

2. The method of claim 1, wherein performing the data traffic processing comprises performing medium access control layer (MAC) scheduling using the wireless parameter limits.

3. The method of claim 1, wherein allocating the computing resources comprises:
    allocating a subset of available computing resources for the data traffic processing; and
    allocating a remainder of the available computing resources for an alternate processing mode.

4. The method of claim 3, wherein the computing resources are one or more of processors, memory, or servers.

5. The method of claim 3, wherein the alternate processing mode is a power saving mode having reduced power consumption relative to the data traffic processing.

6. The method of claim 1, wherein determining the predicted resource load comprises providing network parameters and usage data for the vRAN to the trained neural network model.

7. The method of claim 6, wherein the trained neural network model is a long short term memory (LSTM) neural network model.

8. The method of claim 6, further comprising:
    setting the wireless parameter limits;
    monitoring the data traffic processing while using the wireless parameter limits to obtain training data;
    training the trained neural network model to generate the predicted resource loads using the training data.

9. The method of claim 1, wherein determining the wireless parameter limits comprises setting a maximum number of connected user equipment (UE) devices for the wireless parameter limits.

10. The method of claim 1, wherein determining the wireless parameter limits comprises setting a maximum number of user equipment devices for which the data traffic processing is performed for the wireless parameter limits.

11. The method of claim 1, wherein:
    determining the predicted resource load comprises determining the predicted resource load for a next periodic frame interval of the vRAN; and
    the method further comprises:
    determining the wireless parameter limits comprises determining the wireless parameter limits for the next periodic frame interval; and
    performing the data traffic processing using the wireless parameter limits for the next periodic frame interval.

12. A method for utilizing computing resources in a virtualized radio access network (vRAN), the method comprising:
    setting wireless parameter limits for wireless communication channels served by the vRAN, including setting one or more of a maximum number of radio resource units (RUs) per timeslot and a maximum modulation and coding scheme (MCS) index for the wireless parameter limits, wherein the wireless parameter limits constrain utilization of computing resources for a data traffic processing of the vRAN and the data traffic processing comprises physical layer (PHY) data processing or medium access control layer (MAC) processing for a 5G radio access network;

monitoring the data traffic processing while using the wireless parameter limits to obtain training data;

training a neural network model to generate predicted resource loads for data traffic processing of the vRAN using the training data;

determining a predicted resource load for data traffic processing of the vRAN within a next periodic frame interval; and allocating computing resources for the data traffic processing based on the predicted resource load for the next periodic frame interval.

13. The method of claim 12, the method further comprising:

updating the wireless parameter limits for the wireless communication channels based on the predicted resource load; and performing the data traffic processing using the wireless parameter limits for the next periodic frame interval.

14. The method of claim 12, wherein monitoring the data traffic processing comprises monitoring one or more of network parameters, user equipment parameters, and usage data of the vRAN.

15. The method of claim 12, wherein the usage data includes one or more of a number of user equipment (UEs) scheduled and a data traffic bandwidth requested by the scheduled UEs.

16. The method of claim 12, further comprising performing medium access control layer (MAC) scheduling using the wireless parameter limits.

17. A system for utilizing computing resources in a virtualized radio access network (vRAN), the system comprising:

a plurality of processors configured to execute a vRAN instance and perform data traffic processing of wireless communication channels served by the vRAN instance;

an autoscale processor configured to:

determine a predicted resource load for a data traffic processing of wireless communication channels served by the vRAN instance, wherein the data traffic processing comprises physical layer (PHY) data processing or medium access control layer (MAC) processing for a 5G radio access network;

allocate processors of the plurality of processors for the data traffic processing based on the predicted resource load; and determine wireless parameter limits for the wireless communication channels that constrain utilization of the allocated processors for the data traffic processing, including setting one or more of a maximum number of radio resource units (RUs) per timeslot and a maximum modulation and coding scheme (MCS) index for the wireless parameter limits;

wherein the allocated processors perform the data traffic processing using the wireless parameter limits.

18. The system of claim 17, wherein:

the autoscale processor is configured to perform MAC scheduling using the wireless parameter limits.

19. The system of claim 17, wherein the autoscale processor is configured to allocate a remainder of the plurality of processors for an alternate processing mode.

20. The system of claim 17, wherein the autoscale processor includes a traffic monitor configured to provide network parameters and usage data for the vRAN to a trained neural network model of the autoscale processor that determines the predicted resource load.

* * * * *